United States Patent  [15] 3,661,466
Stimson et al.  [45] May 9, 1972

[54] PHOTOMETRIC SYSTEM FOR CAMERAS

[72] Inventors: Allen G. Stimson, Brighton, N.Y.; John H. Eagle, deceased, late of Irondequoit, N.Y. by Lee A. Eagle, executrix; Lincoln Rochester Trust Co., executor, Rochester, N.Y.

[73] Assignee: Eastman Kodak Company, Rochester, N.Y.

[22] Filed: June 25, 1970

[21] Appl. No.: 49,760

Related U.S. Application Data

[63] Continuation of Ser. No. 337,454, Jan. 13, 1964, abandoned.

[52] U.S. Cl.......................356/217, 95/10, 250/229, 250/231, 356/225, 356/226, 356/229, 356/233
[51] Int. Cl....................G01j 1/34, G01j 1/36, G01j 1/40
[58] Field of Search.................356/205, 217, 221, 224, 225, 356/226, 229; 250/229, 231

Primary Examiner—Ronald L. Wibert
Assistant Examiner—Warren A. Sklar
Attorney—Robert W. Hampton and William F. Delaney, Jr.

[57] ABSTRACT

An exposure control system which automatically compensates for variations in background lighting by exposing a single photocell alternately to the subject and then to the background. A reversing switch is operated synchronously with the means for alternating the exposure of the photocell in such a manner to reverse the direction of the current through the exposure control synchronously with the alternation of the photocell exposure to the scene.

5 Claims, 9 Drawing Figures

PATENTED MAY 9 1972　　　3,661,466

JOHN H. EAGLE, DECEASED,
BY LEE A. EAGLE, EXECUTRIX, and
LINCOLN ROCHESTER TRUST CO., EXECUTOR,
ALLEN G. STIMSON

INVENTORS

BY William F. Delaney Jr.
Robert W. Hampton

ATTORNEYS

PHOTOMETRIC SYSTEM FOR CAMERAS

This is a continuation of U.S. Ser. No. 337,454, filed Jan. 13, 1964, now abandoned, in the names of Allen G. Stimson and John H. Eagle.

The present invention relates to cameras having photoelectric exposure control systems and more particularly concerns improved means to compensate such systems for variations in back-lighting of photographic subjects.

It is well known that photoelectric exposure control systems in cameras ordinarily overexpose or underexpose close subjects when light from the subject is significantly brighter or darker than that from the background, i.e., when the overall scene is high in brightness contrast. An object of the present invention is to compensate accurately for such variations in background lighting.

Several contrast compensating arrangements devised in the past have required the use of a second photocell, in addition to the cell used in the main exposure control system, with all of the attendant disadvantages in using two cells. An object of the present invention is to compensate for scene contrast by means employing only the one photocell required for the main exposure control system.

Other objects of the invention will appear from the following description, reference being made to the accompanying drawings, wherein.

Figure 1A:
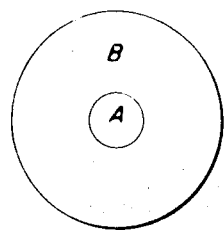
FIG. 1A represents the respective circular scene areas alternately viewed by the photocell in accordance with one form of the invention.
Figure 2:
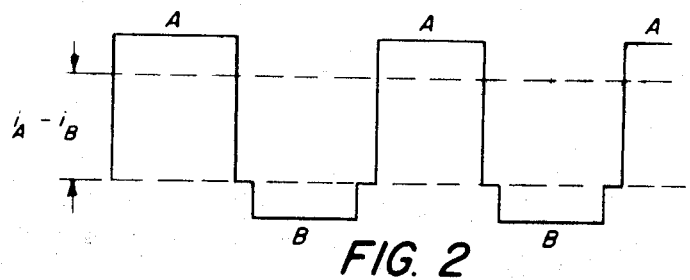
FIG. 2 is a graph of typical meter current versus time in a system constructed according to the invention.
Figure 1B:
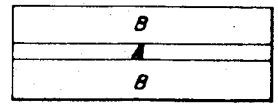
FIG. 1B represents respective rectangular scene areas alternately viewed by the photocell in accordance with another form of the invention.

Referring to FIGS. 1a and 1b, the present invention is employed for illuminating a photocell by light from a scene, alternately from the central scene area, designated "A" and from the entire or peripheral scene area, designated "B." By means of a circuit hereinafter described this produces a meter current as illustrated in FIG. 2, wherein a weighted average response to overall scene brightness is represented by the expression $$i_A - i_B = i.$$

Figure 3:
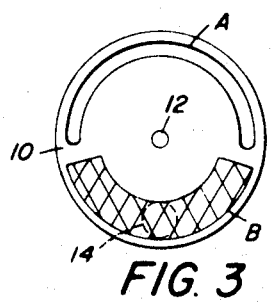
FIG. 3 is a front view of a first form of shutter that can be used in the invention to alternate the field of view of the photocell.
Figure 4:
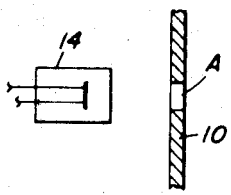
FIGS. 4 and 5 are schematic side views of the photocell and shutter shown in FIG. 3.
Figure 5:
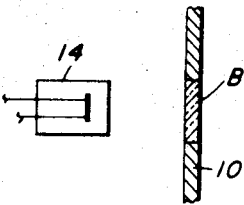

FIGS. 3, 4 and 5 illustrate a shutter disk 10 as for a movie camera, rotatably mounted at 12 and having angularly elongated apertures A and B, through which, upon rotation of disk 10, the photocell 14 is illuminated alternately. The radial width of aperture A is smaller than that of aperture B so that through the former the cell is illuminated primarily by light from the central area of the scene, while through the latter it is illuminated by light from substantially the entire scene that is to be photographed. A neutral density filter or other light attenuator is mounted in or over aperture B so that total illumination of the cell through that aperture is less, for a uniformly bright field, than that through aperture A, which encompasses the central scene area of predominant photographic interest. The ratio of exposure control through apertures A and B is selected on the basis of statistical analysis of numerous amateur photographs and approximates 4:1.

Figure 6:
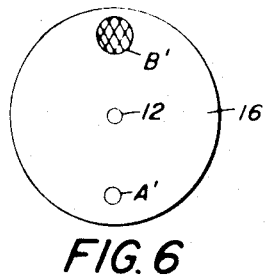
FIG. 6 illustrates a second from of photocell shutter.

FIG. 6 illustrates an intermittent second shutter 16 in which apertures A' and B' are circular rather than elongated and which respect to respective fields A and B of FIG. 1A.

Figure 7:
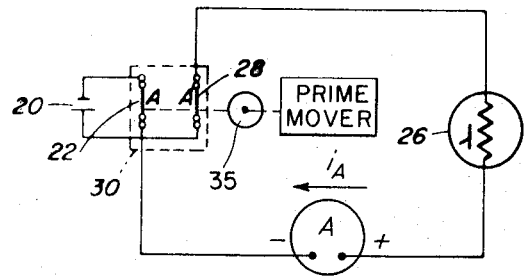
FIGS. 7 and 8 are schematic wiring diagrams of the exposure control circuit, illustrating the commutator in its two different positions of operation.
Figure 8:
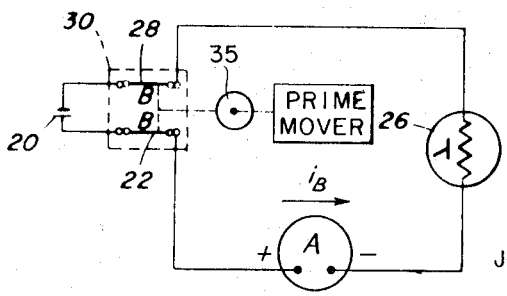

FIGS. 7 and 8 illustrate an exposure control circuit for the invention. A battery 20 is connected in series with a first switch 22, an electric measuring instrument, or meter 24, a photosensitive element such as a photoconductive cell and a second switch 28. Switches 22 and 28 constitute elements of a commutator 30 having two positions of operation, designated A—A and B—B and illustrated in FIGS. 7 and 8, respectively. The commutator is timed by disk 10 or 16 (FIGS. 3 and 6) and driven by a prime mover in a well known manner to assume its two positions A and B when the cell is being illuminated through apertures A and B, respectively, the current through meter 24 being reversed in each case relative to the other, as shown by the arrows $i_A$ and $i_B$ in FIGS. 7 and 8. The net effect of the current reversal on the meter is substantially equivalent to a constant current $i_A - i_B = i$, as illustrated in FIG. 2, assuming the meter response to be sufficiently slow so that it reacts to the average current and does not follow the instantaneous changes in current. The exposure control system in a typical camera includes a diaphragm vane or the like driven by the meter, and the mass of the moving meter parts and the vane prevent the meter from responding to individual current reversals, while permitting it to respond well to changes in the weighted average current $i$.

The meter shutter disk 10 or 16 can be rotated much faster than the camera shutter to eliminate meter oscillations.

The invention has been described in detail with particular reference to preferred embodiments thereof, but it will be understood that variations and modifications can be effected within the spirit and scope of the invention.

It is claimed:

1. Exposure control apparatus, the combination comprising:
   an electric circuit including a photocell and an electric measuring instrument energized under control of said photocell;
   cyclically operable means for exposing said photocell to illumination successively from at least two different field angles which are in close proximity with respect to each other; and
   means for reversing the polarity of energization of said instrument in timed relation to the change from one of said field angles to the other at a rate which is relatively faster than the response time of said electrical measuring instrument so that said instrument measures the average of the output signals from said photocell.

2. Exposure control apparatus comprising:
   a photocell;
   a transducer electrically connected with said photocell;
   a source of current for energizing said transducer under the control of said photocell;
   light-chopping means disposed to intercept illumination incident on said photocell for providing alternately different fields of view in close proximity for said photocell; and
   switching means for cyclically reversing the flow of current through said transducer in synchronization with the change of field of view by said chopping means at a rate relatively faster than the response time of said transducer, so that the transducer is energized by the average current through said photocell.

3. Exposure control apparatus comprising:
   photoresponsive means for providing an electrical signal related in magnitude to the level of illumination incident thereon;
   cyclically operable means for exposing said photoresponsive means alternately during successive cyclic periods to illumination from at least two different field angles in close proximity to render said photoresponsive means effective to alternately provide signals representative of the illumination incident thereon from said field angles, respectively; and
   means for measuring the average of said alternate signals over a time period relatively longer than the cyclic periods during which said photoresponsive means is exposed alternately to said two different field angles.

4. The exposure control apparatus of claim 3, wherein said measuring means further comprises an electrical measuring instrument energized under control of said photo-responsive means and means for reversing the polarity of energization of said instrument in timed relation to the change from one of said two field angles to the other, said electrical measuring instrument having a response time extending over said time period.

5. Exposure control apparatus comprising:
an electric circuit including a photocell and an electrical measuring instrument energized under control of said photocell, cyclically operable means for exposing said photocell alternately to illumination from at least two different field angles in close proximity, and means for reversing the polarity of energization of said instrument in synchronization with the change from one of said two field angles to the other, said instrument having a response time slower than the rate at which said cyclically operable means changes the field angle of said photocell so that the instrument measures the average current through said photocell.

* * * * *